(12) United States Patent
Boesch

(10) Patent No.: US 6,253,076 B1
(45) Date of Patent: Jun. 26, 2001

(54) MANUFACTURING METHOD FOR WIRELESS COMMUNICATIONS DEVICES EMPLOYING POTENTIALLY DIFFERENT VERSIONS OF INTEGRATED CIRCUITS

(75) Inventor: Ronald D. Boesch, Morrisville, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/257,579

(22) Filed: Feb. 25, 1999

(51) Int. Cl.⁷ ....................................................... H04Q 7/20
(52) U.S. Cl. .......................... 455/420; 455/418; 235/375
(58) Field of Search .................................... 455/418, 419, 455/420, 556, 557, 558, 550, 67.1, 67.4; 341/134; 340/10.51, 10.52, 825.22, 825.69, 825.72, 5.25, 5.8, 5.61, 5.1; 710/10; 713/1; 235/375, 486, 494, 385; 29/700, 709, 740, 832

(56) References Cited

U.S. PATENT DOCUMENTS

| | | |
|---|---|---|
| 5,642,307 | 6/1997 | Jernigan . |
| 5,671,435 | 9/1997 | Alpert . |
| 5,675,825 | 10/1997 | Dreyer et al. . |
| 5,715,555 * | 2/1998 | Reber et al. .............................. 8/158 |
| 5,974,312 * | 10/1999 | Hayes, Jr. et al. ................... 455/419 |
| 6,026,007 * | 2/2000 | Jigour et al. ............................ 365/51 |
| 6,027,019 * | 2/2000 | Kou ....................................... 235/375 |

FOREIGN PATENT DOCUMENTS

| | | |
|---|---|---|
| 0 575 127 A2 | 6/1993 | (EP) . |
| 0780813A2 | 11/1996 | (EP) . |
| WO 91/02258 | 2/1991 | (WO) . |

\* cited by examiner

*Primary Examiner*—Dwayne Bost
*Assistant Examiner*—Jean A Gelin
(74) *Attorney, Agent, or Firm*—Coats & Bennett, PLLC

(57) ABSTRACT

During production, a wireless communications device manufacturer determines the version of specific integrated circuits being used by interpreting the response signals generated by the integrated circuits in response to an electronic query. The device manufacturer preferably establishes a cross reference list of response signals and computer chip versions for the affected computer chip type. Each integrated circuit chip manufacturer then designs and manufactures their respective integrated circuit chips to generate their corresponding response signal when a particular predetermined query is received by the chip. During subsequent device production, a factory system is connected to the device and sends the query signal. The computer chip detects this query and, in response, the integrated circuit generates the pre-defined response signal. The factory system compares this generated response signal to the cross-reference list of assigned response signals to determine the integrated circuit version being used. The factory system then selects the appropriate factory settings based on the integrated circuit version identified and loads those factory settings into the wireless communications device. In addition, the factory system may optionally send an activation code to the integrated circuit chip based on the version of integrated circuit chip identified to enable the additional function available on that version of integrated circuit chip.

19 Claims, 1 Drawing Sheet

MANUFACTURING METHOD FOR WIRELESS COMMUNICATIONS DEVICES EMPLOYING POTENTIALLY DIFFERENT VERSIONS OF INTEGRATED CIRCUITS

FIELD OF THE INVENTION

The present invention relates to the manufacturing of wireless communications devices, and more particularly to a method of producing wireless communications devices where one or more integrated circuit chips in the device may be from any one of a plurality of different manufacturers and/or be of different revision levels.

BACKGROUND OF THE INVENTION

Very often in wireless communications devices, it is not possible to get the same performance from different versions of the same integrated circuit chip. These performance variations may lead to undesirable variations in overall product performance. For instance, wireless communications devices, such as cellular telephones, typically rely on Application Specific Integrated Circuit (ASIC) chips to handle incoming and outgoing radio transmissions. During a production run of wireless communications devices, the same type ASIC chip may be from different revision levels of same chip manufacturer and/or from different chip manufacturers. These different "versions" of the same ASIC chip may have slightly different power profiles, such as having different variable gain amplifier power curves and the like. In addition, some chip versions may have certain functionality built in, such as a power saving mode of operation or a particular optional modulation approach, while others may not.

While it is possible to accommodate the different versions of integrated circuit chips via various factory settings in the wireless communications device, it is necessary for the version of the integrated circuit chip to be known in order to make such factory settings. Under the prior art, there are two main approaches for determining the version of the integrated circuit chip: the reel marking approach and the vision system approach. In the reel marking approach, a reel of integrated circuit chips is marked with version information. This version information is then read off the reel manually or by bar code reader or the like. Such a system is susceptible to errors, such as by erroneously reading the version information off an empty reel when loading a new full reel, thereby failing to maintain version information integrity. The vision system approach relies on a marking placed on each individual chip by the chip manufacturer. This marking is read by an automated vision system during the overall device manufacturing process and correlated to a integrated circuit chip version. However, this method may require significant space on the external viewable portion of the integrated circuit chip which may not always be present with the shrinking sizes of integrated circuit chips. In addition, the marking may add cost to the integrated circuit chip. Using either approach, once the chip version is known, the device manufacturer selects and loads the corresponding factory settings into the device using techniques well known in the art.

Thus, it is apparent that there remains a need for a method of dealing with different versions of integrated circuit chips during the manufacture of wireless communications devices that is less susceptible to human error and that does not rely on the physical packaging size of the chip.

SUMMARY OF THE INVENTION

The present invention first identifies the particular version of integrated circuit chip being used in the wireless communications device during production of the device and then sets the factory settings accordingly. In order to identify the version of the integrated circuit chip being used, a predetermined input, or query, signal is sent to the chip. The receipt of the query signal triggers the chip to generate an identifying response signal. Based on the chip's response, the version of the integrated circuit chip being used is determined. Armed with this information, the wireless communications device manufacturer selects and loads the proper factory settings for the particular chip version being used.

The wireless communications device manufacturer preferably establishes a cross reference list of response signals and integrated circuit chip versions for the affected integrated circuit chip type. Each chip manufacturer is told their respective response signals and the chip manufacturer then designs and manufactures its chips to generate the corresponding response signal when a particular query is received by the chip. After the integrated circuit is installed during the overall device production, a factory system is connected to the wireless communications device. The factory system sends the query signal to the integrated circuit. The integrated circuit chip detects this query in a manner well known in the art and, in response, the integrated circuit chip generates the response signal that its manufacturer has pre-programmed into the integrated circuit chip. The response signal generated by the chip is indicative of the version of the integrated circuit. Different chip versions of the same chip type may come about due to the chip type being manufactured by multiple different vendors and/or by different revisions levels of chip design. The chip's response signal is communicated to the factory system and the factory system compares this generated response signal to the cross-reference list of assigned response signals to determine the integrated circuit version being used. The factory system then retrieves the appropriate factory settings based on the integrated circuit version identified and loads those factory settings into the wireless communications device.

It is possible that some versions of a integrated circuit chip may be capable of certain functionality that others versions are not. In order to take advantage of this additional functionality, the wireless communications device manufacturer may load different factory settings for different versions of the integrated circuit chip, even when the versions originate from the same chip manufacturer. In addition, the factory system may optionally send an activation signal to the integrated circuit, based on the version of integrated circuit identified, to enable the additional function available on that version of integrated circuit. In this manner, functions not available on some versions of the integrated circuit may be optionally enabled for those versions that include the function.

Using the present invention, the version of a integrated circuit may be determined after installation of the chip based on the response signal generated by the integrated circuit in response to a query. Based on the version identified, proper factory settings may be loaded, and optionally, selected functionality may be enabled. The present method reduces the opportunity for human error without being dependent on larger physical integrated circuit chip sizes.

DETAILED DESCRIPTION

Figure 1:
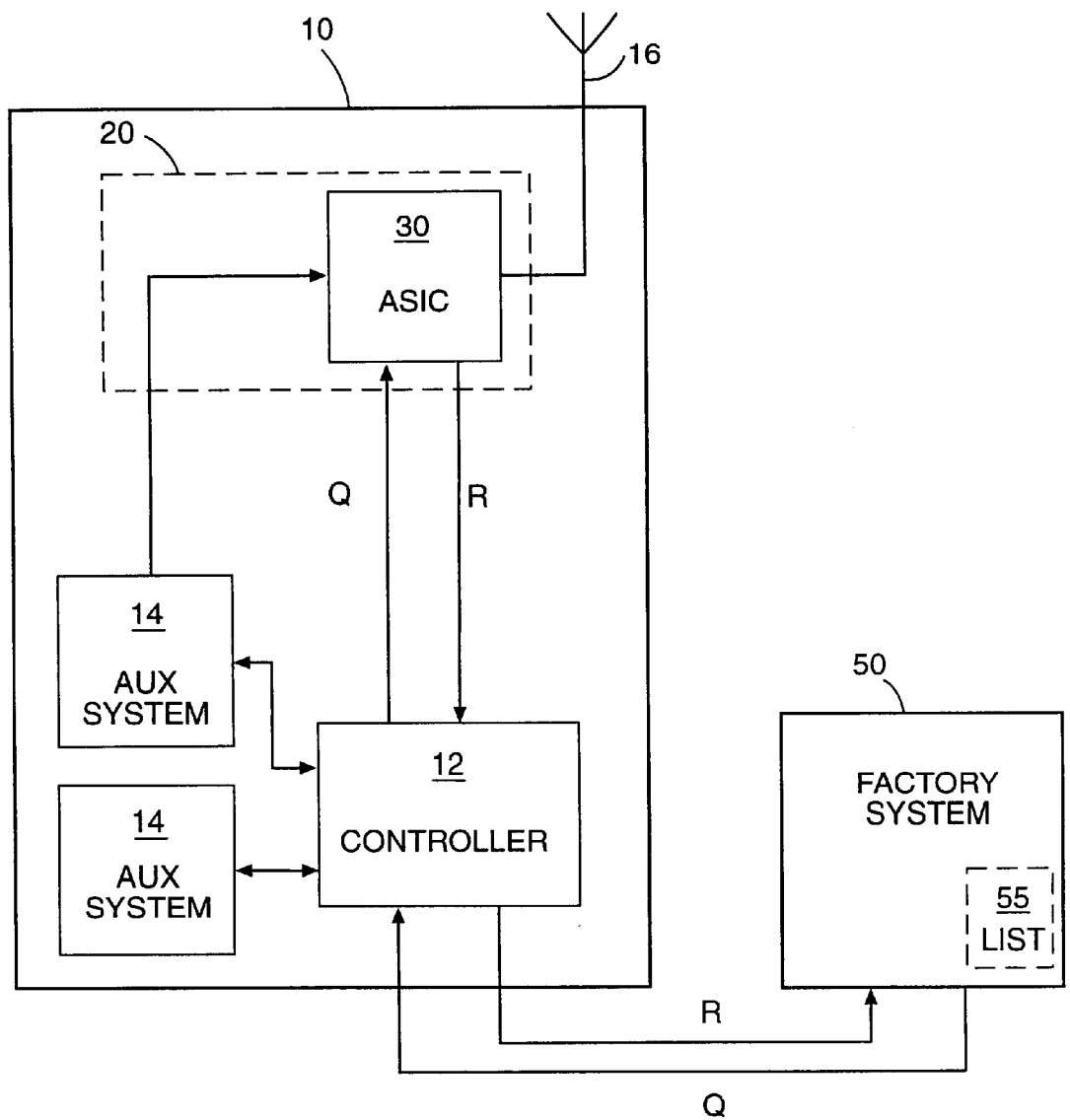
FIG. 1 is a block diagram of a wireless communications device, having a integrated circuit chip according to the present invention, connected to a factory system for loading of factory settings.

For purposes of illustration, the present invention will be discussed in the context of a cellular telephone 10. In general, cellular telephones 10 typically include a controller 12, various auxiliary systems 14, a transceiver 20, and an antenna 16 which work in a manner well known in the art. The transceiver 20 typically includes one or more ASIC integrated circuit chips 30 for controlling various transmit and/or receive signal characteristics, such as power level, modulation, etc. These ASIC integrated circuit chips 30 typically translate signals between an intermediate frequency used internal to the phone 10 and a radio frequency used for transmission. The present invention will be illustrated using such an ASIC chip 30.

Due to production volume demands, it is not uncommon for a particular phone manufacturer to use ASIC chips 30 of a given type that have been manufactured by any one of a plurality of chip manufacturers. For ease of reference, two ASIC chips 30 are considered to be of the same "type" when they perform the same general overall function, such as radio frequency modulation or demodulation, in interchangeable structures. In order to allow for multiple sources of supply, the phone manufacturer develops a detailed specification that is common to all the ASIC chips 30 of the particular type. This common specification is forwarded to the various chip manufacturers who make integrated circuit chips 30 that are intended to meet the specification.

The various chip manufacturers may choose to implement the chip's common specification in different ways, resulting in slightly different performance characteristics for the same type ASIC chip 30. Further, individual chip manufacturers may develop new chip designs that alter existing functions or allow for added functionality in the ASIC chip 30. Such new designs are referred to as having different revision levels or releases. For clarity, these differences will be referred to as different "versions." Thus, two ASIC chips 30 of the same type are considered to be of different "versions" when they are made by different chip manufacturers and/or when they are from chip designs having different revision levels. For these different chip versions, a separate detailed "supplier-specific" specification is typically added to the common specification.

It should be noted that all modifications to the design of the ASIC chip 30 cannot necessarily be easily incorporated into the common specification. For instance, new functionality from Vendor A may be based on a proprietary new design or manufacturing development. As such, the information needed to implement this new functionality may not be transferable to Vendor B without encroaching on Vendor A's intellectual property rights. As such, the functionality, even if highly desirable, may be impossible to incorporate into the common specification. However, the functionality may obviously be incorporated into the Vendor A's supplier-specific specification without encountering such problems.

In many cases, phone manufacturers must make numerous factory settings to compensate for the performance differences in the different versions of the same type ASIC chip 30. These factory settings, for instance, help determine how the controller 12, and/or the auxiliary systems 14, function to provide appropriate inputs to the ASIC chip 30. It is common for one group of factory settings to be proper for the ASIC chips 30 from one chip manufacturer, while a different group of factory settings to be proper for ASIC chips 30 of the same type supplied from another chip manufacturer. Likewise, one group of factory settings may be proper for the ASIC chips 30 of a particular revision level from one chip manufacturer, while a different group of factory settings may be proper for the same type ASIC chip 30 of a different revision level from the same chip manufacturer. Thus, it is important for the phone manufacturer to know which particular chip version is being used during production of the phone 10 so that proper factory settings may be made.

The present invention interrogates the ASIC chip 30 and, based on the ASIC chip's response, determines the chip version of the ASIC 30. Armed with this information, the phone manufacturer selects and loads the proper factory settings for the particular chip version being used in the phone 10.

To facilitate identification of the chip version being used, the phone manufacturer provides each ASIC chip manufacturer with a supplier specific specification requiring a particular pre-determined response signal to be generated by the chip 30 when the chip 30 is interrogated, or queried, using a predetermined input, or query, signal. A different response signal is required for each version of the chip 30. Typically, the phone manufacturer first establishes a cross reference list 55 of response signals and chip versions for the affected chip type. At a minimum, each chip manufacturer for that chip type is assigned at least one unique response signal. Each chip manufacturer is told their respective response signals, but preferably not the response signals of any competitors. The chip manufacturer then designs and manufactures its integrated circuit chips 30 to generate the corresponding response signal when the query signal is received by the chip 30.

The integrated circuit 30 is thereafter installed during production of the phone 10. This is typically done by affixing the chip 30 to the main printed circuit board of the phone 10 in any conventional manner. Thereafter, the factory settings are loaded. To do so, a factory system 50 is connected to the phone 10, or at least the circuit board having the subject integrated circuit 30 thereon. In addition to any other tasks known in the art, the factory system 50 sends a specific predetermined input query signal to the integrated circuit 30. The query signal is typically sent to the integrated circuit 30 electronically, but other methods, such as optical transmission, or any other method known in the art, may also be used. This query signal is typically routed to the ASIC chip 30 via the phone's controller 12 as part of a serial instruction set. For instance, the query may be assigned to the sixth word in the serial instruction, and the query word may be a particular signal such as "0010110". The ASIC chip 30 detects this query in a manner well known in the art. In response, the ASIC chip 30 generates the response signal that its manufacturer has pre-programmed into the ASIC chip 30. The response signal may be generated as a signal on a particular output port set aside for that purpose, or may instead be the generation of a predetermined pattern on one or more selected input/output ports on the ASIC 30 that are also used for other purposes. This response signal is communicated to the factory system 50.

The factory system 50 compares this generated response signal to the cross-reference list 55 of assigned response signals to determine the version of the integrated circuit 30 being used. If desired, the factory system 50 may first check if an invalid response signal was received and sound an alarm or otherwise reject the phone 10 if the response signal is invalid. If a valid response signal is received, the factory system 50 selects the appropriate factory settings based on the chip version identified and loads those factory settings into the phone 10 in any manner well known in the art. For instance, the factory system 50 may utilize a look-up table to determine the chip version corresponding to the response signal generated by the chip 30, and then use a database to select the corresponding factory settings. These factory settings typically include information sent to the phone's controller 12, or information sent to other portions of the phone 10, that affect the inputs to the integrated circuit 30 so as to help ensure proper operation of the phone 10.

As indicated above, different versions of integrated circuits 30 from the same manufacturer may have additional functionality beyond that required by the common specification. For instance, RF ASICs from a single vendor may have two versions, a first version having a first type of power savings routine and a second version having a second, more efficient, type of power savings routine. In such a situation, the chip manufacturer would be assigned a plurality of response signals with a different response signal being assigned to each chip version of the chip type from that chip manufacturer. The particular chip version of ASIC chip 30 would be detected based on the response signal, thereby identifying which power savings approach was available. When the first ASIC chip version is detected, the factory settings loaded into the phone 10 would be appropriate for the first type of power savings routine. When the second ASIC chip version is detected, the factory settings loaded into the phone 10 would be appropriate for the second type of power savings routine. Thus, two different chip versions of the same chip type from a single chip vendor may have different factory settings.

In addition, the factory settings sent by the factory system 50 may optionally include an activation signal to enable selected functions available on that version of integrated circuit 30. To modify the example given above, assume that the second version of ASIC chip 30 has the capability of executing both the first type of power savings and the second, more efficient, type of power savings. When the second ASIC chip version is detected, factory settings appropriate for the second type of power savings that include the activation signal could be loaded for high performance phones 10, while factory settings appropriate for the first type of power savings, not including the activation signal, could be loaded for low-end phones 10. In this manner, functions not available on some versions of the integrated circuit 30 may be enabled for those versions that include the function.

The present invention is appropriate for not only cellular telephones 10, but any wireless communications device 10, for example, satellite phones, personal digital assistants, and the like.

Using the present invention, the version of a integrated circuit 30 may be determined after installation of the chip 30 based on the response signal generated by the integrated circuit 30 in response to a query. Based on the chip version identified, factory settings may be loaded, and optionally, selected functionality may be enabled. While not required, this method may also be used to specifically identify the manufacturer of the integrated circuit 30. The present method reduces the opportunity for human error without being dependent on larger physical integrated circuit chip sizes. In addition, the wireless communications device 10 itself need not be unduly burdened with the added complexity necessary to distinguish between the different possible versions of the integrated circuit 30 and store all the possible settings required; the factory system 50 may instead be so burdened, thereby allowing for lower overall cost for wireless communications devices 10.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of establishing factory settings for a wireless communications device, the wireless communications device having at least one integrated circuit of a type having multiple possible versions, comprising:
   a) sending a predetermined input signal to the integrated circuit;
   b) responding to said input signal by said integrated circuit generating a predetermined response signal indicative of the version of said integrated circuit;
   c) identifying the version of said integrated circuit based on said generated response signal;
   d) selecting one or more appropriate factory settings for said wireless communications device based on said identified version of said integrated circuit;
   e) loading said selected factory settings in said wireless communications device.

2. The method of claim 1 wherein said factory settings include an activation signal enabling one or more functions of said integrated circuit.

3. The method of claim 1 wherein said possible versions of said integrated circuits belong to either a first group having an additional function which may be selectively enabled or a second group not having said additional function and wherein said factory setting includes an activation signal enabling said additional function if the identified version belongs to said first group and not including said activation signal if the identified version belongs to said second group.

4. The method of claim 1 further including installing said integrated circuit in the wireless communications device before said sending of said input signal.

5. The method of claim 1 further including assigning a unique response signal to each integrated circuit version before said sending of said input signal.

6. The method of claim 1 wherein said versions correspond to different manufacturers of said integrated circuit.

7. The method of claim 1 wherein said versions correspond to different revision levels of said integrated circuit from the same manufacturer.

8. The method of claim 1 wherein said integrated circuit is an ASIC.

9. The method of claim 8 wherein said integrated circuit is an ASIC for conditioning signals in a wireless communications device by adjusting one or more characteristics of the signal selected from the group consisting of frequency, amplitude, and modulation.

10. The method of claim 1 wherein said input signal is electronically sent to the integrated circuit.

11. The method of claim 1 wherein said factory settings include calibration information for said wireless communications device.

12. The method of claim 1 wherein said wireless communications device is a cellular telephone.

13. A method of establishing factory settings for a wireless communications device, the wireless communications device having at least one integrated circuit, comprising:
   a) establishing a plurality of versions for the integrated circuit, wherein at least one of said versions includes functionality not present in another one of said versions;

b) establishing a list having a plurality of allowed response signals;

c) assigning to each version at least one of said response signals from said list;

d) thereafter, electronically querying said integrated circuit to prompt the generation of a response signal by said integrated circuit;

e) comparing said response signal generated by said integrated circuit to said list of response signals to identify the version of said integrated circuit;

f) selecting one or more factory settings for said wireless communications device based on said identified version of said integrated circuit;

g) loading said selected factory settings in said wireless communications device; and h) activating said functionality if said response signal corresponds to an integrated circuit version having said functionality.

14. The method of claim 13 further including installing said integrated circuit in the wireless communications device before said querying.

15. The method of claim 13 wherein said integrated circuit is an ASIC.

16. The method of claim 15 wherein said integrated circuit is an ASIC for conditioning signals in a wireless communications device by adjusting one or more characteristics of the signal selected from the group consisting of frequency, amplitude, and modulation.

17. The method of claim 13 wherein said input signal is electronically sent to the integrated circuit.

18. The method of claim 13 wherein said factory settings include calibration information for said wireless communications device.

19. The method of claim 13 wherein said wireless communications device is a cellular telephone.

* * * * *